(12) United States Patent
Bebeti et al.

(10) Patent No.: US 12,090,859 B2
(45) Date of Patent: Sep. 17, 2024

(54) METHOD AND CONTROLLER FOR CONTROLLING THE FLOW OF ELECTRICAL POWER IN A WORKING VEHICLE

(71) Applicant: ZF Friedrichshafen AG, Friedrichshafen (DE)

(72) Inventors: Migen Bebeti, Munich (DE); Rico Glöckner, Pocking (DE); Jürgen Legner, Friedrichshafen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 420 days.

(21) Appl. No.: 17/439,896

(22) PCT Filed: Mar. 18, 2020

(86) PCT No.: PCT/EP2020/057381
§ 371 (c)(1),
(2) Date: Sep. 16, 2021

(87) PCT Pub. No.: WO2020/187961
PCT Pub. Date: Sep. 24, 2020

(65) Prior Publication Data
US 2022/0185114 A1 Jun. 16, 2022

(30) Foreign Application Priority Data
Mar. 19, 2019 (DE) .......................... 102019203731.3

(51) Int. Cl.
*B60L 1/00* (2006.01)
*B60L 50/60* (2019.01)
*B60L 50/70* (2019.01)

(52) U.S. Cl.
CPC ............... *B60L 1/003* (2013.01); *B60L 50/60* (2019.02); *B60L 50/70* (2019.02); *B60L 2200/40* (2013.01)

(58) Field of Classification Search
CPC .......... B60L 1/003; B60L 50/60; B60L 50/70; B60L 2200/40; B60L 2220/42; B60L 2240/423; B60L 7/10
See application file for complete search history.

(56) References Cited

U.S. PATENT DOCUMENTS 10,960,785 B2 * 3/2021 Villanueva ............. B64U 20/96
11,361,392 B2 * 6/2022 Bhattarai .................. H02J 3/32
(Continued)

FOREIGN PATENT DOCUMENTS

DE 102004023929 A1 12/2004
DE 102016223186 A1 5/2018
(Continued)

OTHER PUBLICATIONS

International Search Report and Written Opinion for PCT/EP2020/057381 mailed May 29, 2020 (11 pages; with English translation).

*Primary Examiner* — Yonel Beaulieu
(74) *Attorney, Agent, or Firm* — Kristin L. Murphy

(57) ABSTRACT

The disclosure relates to a method for controlling a flow of electrical power between an electrical energy source and at least two electric machines of a working vehicle. In one step, an electrical power which can be drawn from the energy source is determined. In a further step, at least two electrical powers which are required for the at least two electric machines are determined. In yet another step, the electrical power which can be drawn is distributed to the at least two electric machines in the ratio of the at least two required electrical powers, such a distribution being carried out if the sum of the at least two required electrical powers is greater than the electrical power which can be drawn. The disclo- (Continued)

sure also relates to a controller for carrying out the described method and to a working vehicle having such a controller.

20 Claims, 3 Drawing Sheets

(56) References Cited

U.S. PATENT DOCUMENTS

| | | | |
|---|---|---|---|
| 11,435,762 B1 * | 9/2022 | Auerbach | B64C 29/0025 |
| 11,447,244 B1 * | 9/2022 | Griffin | B64D 43/02 |
| 11,479,146 B2 * | 10/2022 | Villanueva | B60L 58/26 |
| 11,548,407 B2 * | 1/2023 | Villanueva | H01M 50/204 |
| 2009/0156068 A1 * | 6/2009 | Barrett | B60K 1/02 |
| | | | 440/49 |
| 2013/0173098 A1 | 7/2013 | Takagi | |
| 2015/0042157 A1 * | 2/2015 | Chen | B60L 50/40 |
| | | | 307/9.1 |
| 2015/0046012 A1 * | 2/2015 | Chen | B60L 3/12 |
| | | | 701/22 |
| 2016/0099571 A1 * | 4/2016 | Gelonese | H02J 3/381 |
| | | | 307/23 |
| 2018/0009321 A1 * | 1/2018 | Ricci | G06Q 20/14 |
| 2018/0059633 A1 * | 3/2018 | Garg | G05B 19/048 |
| 2022/0072962 A1 * | 3/2022 | Maury | G06F 16/909 |
| 2023/0016787 A1 * | 1/2023 | Wiegman | H02J 1/084 |
| 2023/0083236 A1 * | 3/2023 | Kumar | H02P 3/18 |
| | | | 307/10.1 |
| 2023/0120740 A1 * | 4/2023 | Lewchuk | B60L 53/54 |
| | | | 320/109 |
| 2023/0202336 A1 * | 6/2023 | Lu | B60L 53/67 |
| | | | 320/109 |
| 2023/0223752 A1 * | 7/2023 | Wang | F01D 15/10 |
| | | | 307/9.1 |

FOREIGN PATENT DOCUMENTS

| | | | | |
|---|---|---|---|---|
| DE | 102017211978 A1 | | 1/2019 | |
| EP | 2564684 A1 | | 3/2013 | |
| EP | 3450235 A1 | | 3/2019 | |
| EP | 4227139 A1 | * | 8/2023 | B60L 1/003 |
| WO | WO-2016182931 A1 | * | 11/2016 | G05B 15/02 |
| WO | WO-2021037673 A1 | * | 3/2021 | H02J 3/14 |

\* cited by examiner

METHOD AND CONTROLLER FOR CONTROLLING THE FLOW OF ELECTRICAL POWER IN A WORKING VEHICLE

CROSS-REFERENCE TO RELATED APPLICATION

This application is a national stage of International Application No. PCT/EP2020/057381, filed Mar. 18, 2020, the disclosure of which is incorporated herein by reference in its entirety, and which claimed priority to German Patent Application No. 102019203731.3, filed Mar. 19, 2019, the disclosure of which is incorporated herein by reference in its entirety.

TECHNICAL FIELD

The disclosure relates to a method for controlling a flow of electrical power between an electrical energy source and at least two electric machines of a vehicle. The disclosure relates additionally to a controller for carrying out such a method and to a vehicle having such a controller.

BACKGROUND

A vehicle can have an electrical energy source and an electric motor for driving the vehicle. A motor power currently required by a driver of the vehicle can be limited by an electrical power which can currently be drawn from the electrical energy source.

A working vehicle can have, in addition to an electric motor as a main electrical consumer, also at least one further main electrical consumer and/or at least one auxiliary electrical consumer. The driver of the working vehicle can require, in addition to a motor power for the electric motor for driving the working vehicle, also at least one further power for the at least one further main electrical consumer and/or the at least one auxiliary electrical consumer.

SUMMARY

The disclosure relates in one aspect to a method for controlling a flow of electrical power between an electrical energy source and at least two electric machines of a working vehicle.

The flow of electrical power can comprise at least one unidirectional flow of electrical power from the electrical energy source to at least one electric machine of the at least two electric machines. In other words, electrical energy can be transmitted from the electrical energy source to at least one electric machine of the at least two electric machines.

Alternatively, or in addition to the at least one unidirectional flow of electrical power, the flow of electrical power can comprise at least one bidirectional flow of power between the electrical energy source and at least one electric machine of the at least two electric machines. The bidirectional flow of power can be in the form of either a flow of electrical power from the electrical energy source to an electric machine or vice versa. In other words, electrical energy can be transmitted from the electrical energy source to at least one electric machine of the at least two electric machines, or electrical energy can be transmitted from the at least one electric machine of the at least two electric machines to the electrical energy source.

In addition to the at least one unidirectional and/or bidirectional flow of electrical power, the flow of electrical power can comprise a unidirectional or a bidirectional flow of electrical power between two electric machines of the at least two electric machines. In other words, electrical energy can also be transmitted between two electric machines of the at least two electric machines.

The electrical energy source can comprise an energy store and/or an energy generator for supplying the at least two electric machines with electrical energy. The electric machines can be electrical energy converters. The electric machine can be operable as an electric motor and/or as an electric generator. An electric machine can be in the form of a main electrical consumer or in the form of an auxiliary electrical consumer of the working vehicle. In other words, the electric machines of the working vehicle can be electrical consumers. In one exemplary arrangement, the working vehicle has at least two main electrical consumers. In a further exemplary arrangement, the working vehicle additionally has at least one auxiliary electrical consumer.

The working vehicle can be a self-driving working machine (sfAM), or a self-driving working vehicle. The self-driving working machine can be a mobile working machine. For example, the working vehicle can be an agricultural utility vehicle, an industrial truck or a construction machinery vehicle.

The working vehicle can be in the form of a vehicle which is configured to perform at least one working activity that is not intended for conveying people and/or goods. The working vehicle can comprise for this purpose a working device, or a working tool, for performing the at least one such working activity. The working device, or the working tool, can be actuatable by an electric machine of the working vehicle. The working activity that is not intended for conveying people and/or goods can be, for example, the handling and/or manipulation of goods or objects by means of the working device, or the working tool.

The method comprises as one step a determination of an electrical power which can be drawn from the energy source. The electrical power which can be drawn from the energy source can be an electrical power which can be made available by the energy source. In other words, the electrical power which can be drawn from the energy source can be an electrical power that is available at the working vehicle.

The method comprises as a further step a determination of at least two electrical powers required for the at least two electric machines. The at least two required electrical powers can be required by the at least two electric machines or can be required by a requiring device for the two electric machines. The requiring device can comprise a power electronics. The required electrical powers can comprise electrical powers demanded from the electrical energy source for the at least two electric machines. The required electrical powers can exceed the electrical power which can be drawn. In other words, the method as such can be carried out only if the required electrical powers exceed the electrical power which can be drawn. This situation can be present temporarily or permanently during operation of the working vehicle.

At least one of the two determination steps can comprise an ascertainment and/or detection of the respective electrical power. The determination, ascertainment and/or detection of the respective electrical power can take place via a respective power electronics.

The method comprises as a further step a distribution of the electrical power which can be drawn to the at least two electric machines in the ratio of the at least two required electrical powers. The step of distribution is carried out if the sum of the at least two required electrical powers is greater than the electrical power which can be drawn. Only then can this step be carried out. The sum can be the result of the addition of the at least two required electrical powers. The ratio can be a quantity relationship or a percentage ratio between the at least two required electrical powers. The ratio can further comprise a predefined weighting of the at least two required electrical powers.

The distribution of the electrical power which can be drawn can comprise an apportionment of the electrical power which can be drawn to the at least two electric machines. In other words, the distribution, or apportionment, can be carried out according to the ratio of the at least two required electrical powers.

The distribution can also comprise an allocation, or assignment, of the electrical power which can be drawn to at least one electric machine of the at least two electric machines. The allocation, or assignment, can comprise an allocation or assignment of the totality, a sub-totality or none of the electrical power to the at least one electric machine.

By means of the disclosure, energy flow management for an electrically operable working vehicle can be provided. If electrical powers currently required at the working vehicle exceed an electrical power that is currently available at the working vehicle, the currently available electrical power can be requested in the current requirement ratio. Electrical powers required by an operator of the working vehicle for at least two electric machines may thus initially exceed an available electrical power. In dependence on an electrical power which can currently be drawn from the electrical energy source, that electrical power can then be allocated in a rationed manner to a plurality of electric machines, that is to say to at least two electric machines.

In one exemplary arrangement of the method, the step of distribution comprises an allocation, which can be carried out independently of the required electrical powers, of a predefined minimum proportion of the electrical powers which can be drawn to one of the at least two electric machines. In other words, a proportion of the electrical power which can be drawn can be reserved for allocation to one electric machine of the at least two electric machines. A supply of energy to the electric machine to which the reserved electrical power can be allocated can thus be prioritized during operation of the working vehicle. Alternatively, to an allocation, or prioritization, of a predefined minimum proportion, the step of distribution can also comprise an allocation, which can be carried out independently of the required electrical powers, of a predefined maximum proportion of the electrical powers which can be drawn to one of the at least two electric machines. With an allocation of a minimum proportion or of a maximum proportion, a minimum electrical power or a maximum electrical power can advantageously be defined in the distribution of the electrical power which can be drawn to the at least two electric machines.

In a further exemplary arrangement of the disclosure, the step of distribution comprises a distribution of a portion of the electrical power which can be drawn in dependence on a state of the energy source. The state of the energy source can comprise a charge state of the energy source, a working life of the energy source or an operating temperature of the energy source. By taking account of the state of the energy source in the control of the flow of power, an efficiency of the electrical energy source can advantageously be maintained. Thus, in one example, a predefined working life of the electrical energy source can be maintained. If the electrical energy source is a battery, cases of overheating can thus additionally be avoided.

A further exemplary arrangement of the method comprises as a further step a determination of an electrical power which can be drawn from one electric machine of the at least two electric machines by energy recovery. The energy recovery from the one electric machine can be recuperation therefrom. The energy recovery can comprise a generator power of the electric machine. If an electrical power can be drawn from the one electric machine by energy recovery, this electric machine can require no electrical power from the electrical energy source during that time. The method can accordingly advantageously also be carried out in order to control a flow of electrical power between an energy source and at least one recuperative electric machine. The method can therefore also be implemented while taking into account a recuperative energy system on the working vehicle. In other words, energy can also be transmitted between the electric machines in the flow of electrical power.

The electrical power which can be drawn from the at least one electric machine can be taken into account in the step of distribution. The step of distribution can thus additionally comprise a taking into account of an electrical power which can be drawn from an electric machine. Electrical power can thus additionally flow between the electric machine from which electrical power can be drawn by energy recovery and at least one other electric machine of the at least two electric machines.

In a further exemplary arrangement of the method, the step of distribution comprises an allocation of the electrical power which can be drawn from the electric machine to the at least one other electric machine of the at least two electric machines. The allocation can comprise an allocation to a single other electric machine. Alternatively, the allocation can comprise a distribution of the electrical power which can be drawn from the electric machine to at least two other electric machines of at least three electric machines of the working vehicle. Such a distribution of an electrical power which can be drawn by energy recovery to at least two other electric machines can also be carried out in the ratio of the electrical powers required for the at least two other machines. Alternatively, the electrical power which can be drawn from the electric machine can also advantageously be allocated to a vehicle brake in order to boost the braking ability thereof.

Alternatively, or in addition to the preceding arrangement, it can be possible to allocate an electrical power which can be drawn from an electric machine to the electrical energy source. A flow of electrical power from the electric machine to the electrical energy source can be present in order to supply the electrical energy source with energy. If the electrical energy source is a battery, the battery can thus be recharged.

In dependence on the state of the electrical energy source, such a flow of energy can be cut or limited. The method can accordingly comprise as a further step a cutting or limitation of a flow of electrical power from an electric machine to the electrical energy source in dependence on the state of the electrical energy source. In other words, a flow of power for charging the electrical energy source can be interrupted in order to avoid overcharging of the electrical energy source. An electric machine from which power can be drawn can be deenergized for this purpose. To this end, a switch provided in the flow of electrical power can be actuated, for example, which switch cuts the flow of power, or a flow of current, to the electric machine.

In a further exemplary arrangement of the method, one electric machine of the at least two electric machines is configured to drive a drive train of the working vehicle. For the drive train, or for a so-called "driveline" of the working vehicle, a power can be required for moving the working vehicle. The drive train can comprise a (power-shift) transmission, electrical pressure assistance and/or a chassis, which can have a front axle and a rear axle.

Alternatively, or in addition, another electric machine of the at least two electric machines can be configured to drive a working hydraulics system of the working vehicle. For the working hydraulics system, a power can be required for moving the working device, or the working tool. Alternatively, or in addition, the working hydraulics system can comprise a steering hydraulics system for steering the working vehicle.

For the at least two electric machines, electrical powers can be required in parallel or alternately for driving the drive train and the working hydraulics system separately, in parallel, in succession or in an alternating manner. The method thus permits the power, which can currently be drawn from the electrical energy source, to be advantageously be distributed to the drive train and to the working hydraulics system according to the current ratio of the powers required therefor. A working power of a working device can thus advantageously be controlled while the working vehicle is moving with a branched flow of power to the drive train and the working hydraulics system in the ratio of a plurality of required powers.

In a further exemplary arrangement of the method, the electrical energy source comprises a battery. The working vehicle can thus be in the form of a working vehicle which is operable by the battery. The working vehicle can thus be a so-called BEV working vehicle. The battery can be a traction battery. A power which can be drawn from the battery as the electrical energy source can be dependent on a current charging capacity of the battery.

In a further exemplary arrangement of the method, the electrical energy source comprises a fuel cell. The working vehicle can thus be in the form of a working vehicle which is operable by the fuel cell. The working vehicle can thus be a so-called FCEV working vehicle. If the working vehicle has a battery according to the preceding arrangement in addition to the fuel cell, the battery can function for the intermediate storage of electrical energy generated by the fuel cell. The electrical energy source can therefore also be an intermediate electrical energy store.

The disclosure relates in a further aspect to a controller for controlling a flow of electrical power between an electrical energy source and at least two electric machines of a working vehicle. The controller can be adapted to implement the method according to the preceding aspect. The controller can comprise for this purpose a corresponding power flow controller. The controller can additionally comprise a power flow regulator for regulating the flow of power. Energy consumed by the electric machines can be used in a feedback step for regulating the electrical power which can be drawn and/or the electrical powers to be distributed to the electric machines.

The controller comprises an interface for the inputting of a specific value of an electrical power which can be drawn from the energy source. The controller can be connected via the interface to a determination unit for determining the value. The value can be, for example, a physical value of the electrical power which can be drawn from the energy source.

The controller additionally comprises an interface for the inputting of specific quantities of at least two electrical powers required for the at least two electric machines. The controller can be connected via the interface to determination units for determining the quantities. The quantities can be physical quantities of the electrical powers required for the at least two electric machines.

The controller additionally comprises a computing unit which is adapted to calculate distribution quantities for the distribution of the electrical power which can be drawn to the at least two electric machines in the ratio of the at least two required electrical powers. The distribution quantities can be physical quantities of the electrical power to be distributed. The distribution quantities are calculated by the computing unit when a sum of the at least two required electrical powers is greater than the electrical power which can be drawn.

The controller additionally comprises an interface for the outputting of the calculated distribution quantities. The calculated distribution quantities can be outputted by a distribution device for the distribution of the power which can be drawn to the at least two electric machines according to the disclosure. The distribution device can comprise a (central) power electronics or respective power electronics associated with each of the at least two electric machines.

BRIEF DESCRIPTION OF THE DRAWINGS

The disclosure relates in a further aspect to a working vehicle having an electrical energy source, at least two electric machines and a controller according to the preceding aspect. The working vehicle can be in the form of a working vehicle which is operable in an automated, or autonomous, manner.

DETAILED DESCRIPTION

Figure 1:
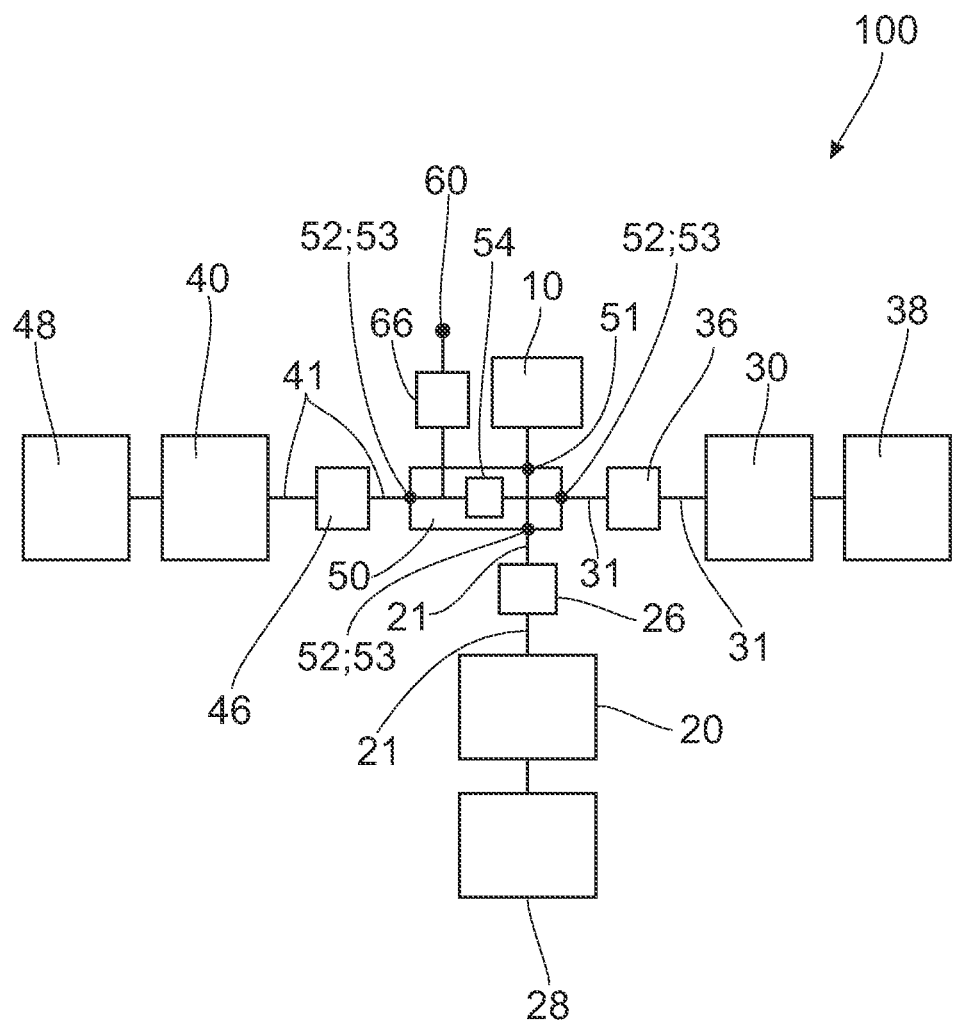
FIG. 1 shows a system for controlling a flow of electrical power for explaining a method, the controller and the working vehicle according to a respective exemplary arrangement of the disclosure.

The system 100 shown in FIG. 1 comprises an electrical energy source 10, a first electric machine 20, a second electric machine 30, a third electric machine 40 and a controller 50. The system 100 is arranged on a working vehicle, not shown in the figures.

The electrical energy source 10 is connected to the controller 50 via a first input interface 51 and in one exemplary arrangement is in the form of a battery. The first electric machine 20 is connected to the controller 50 via a power electronics 26 of the first electric machine 20. The power electronics 26 is connected to the controller 50 via a second input interface 52 and a second output interface 53. The second electric machine 30 is connected to the controller 50 via a power electronics 36 of the second electric machine 30. The power electronics 36 is connected to the controller 50 via a further second input interface 52 and a further second output interface 53. The third electric machine 40 is connected to the controller 50 via a power electronics 46 of the third electric machine 40. The power electronics 46 is connected to the controller 50 via a further second input interface 52 and a further second output interface 53.

The first electric machine 20 is operatively connected to a drive train 28 for the driving thereof. The second electric machine 30 is operatively connected to a working hydraulics system 38 for the driving thereof. The electric machines 20, 30 of the drive train 28 and of the working hydraulics system 38 are in one exemplary arrangement, in the form of main electrical consumers of the working vehicle. The third electric machine 40 is operatively connected to a further working device 48 of the working vehicle for actuation thereof. The third electric machine 40 of the working device 48 is in one exemplary arrangement, in the form of an auxiliary electrical consumer of the working vehicle.

The connections between the controller 50 and the electric machines 20, 30, 40 each have a respective flow of power 21, 31, 41. The flow of power 21 to the first electric machine 20 leads via the power electronics 26 of the first electric machine 20 for transforming an energy which can be drawn from the electrical energy source 10. The flow of power 31 to the second electric machine 30 leads via the power electronics 36 of the second electric machine 30 for transforming an energy which can be drawn from the electrical energy source 10. The flow of power 41 to the third electric machine 40 leads via the power electronics 46 of the third electric machine 40 for transforming an energy which can be drawn from the electrical energy source 10.

For the electric machines 20, 30, 40, or for the drive train 28, the working hydraulics system 38 and the working device 48, respective electrical powers are required via the power electronics 26, 36, 46. The required electrical powers exceed in total an electrical power which can be drawn from the electrical energy source 10. The electrical power which can be drawn from the electrical energy source 10 is apportioned by the controller 50 in the ratio of the required electrical powers to the flows of power 21, 31, 41 in the ratio of the required powers. Physical quantities of the electrical power portions to be apportioned for the flows of power 21, 31, 41 are for this purpose calculated by a computing unit 54 of the controller 50.

The electrical energy source 10 is additionally connected via the controller 50 to a charging connection 60 for charging the electrical energy source 10. If energy is drawn from the electrical energy source 10, the electrical energy source can be recharged by an external energy source (not shown) via the charging connection 10. For this purpose, the charging connection 60 is connected to the controller 50 via a power electronics 66 of the charging connection 60.

Figure 2:
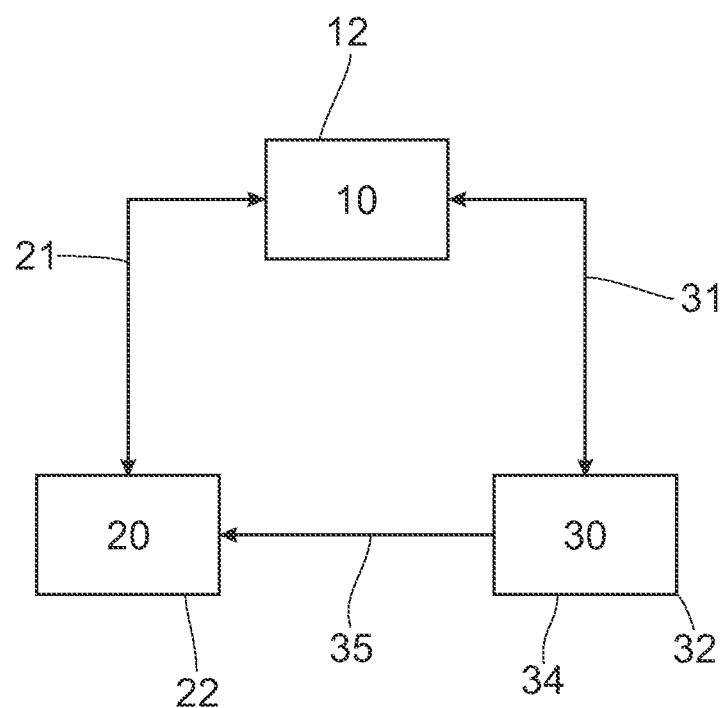
FIG. 2 shows, schematically, a flow of electrical power for further explaining the method, the controller and the working vehicle.

In FIG. 2, the two flows of energy 21, 31 from the electrical energy source 10 to the first electric machine 10 and to the second electric machine 20 are explained in greater detail by way of example. Associated with the electrical energy source 10 is an electrical power 12 which can be drawn from the electrical energy source 10. Associated with the first electric machine 20 is an electrical power 22 required by the first electric machine 20. Associated with the second electric machine 30 is also an electrical power 32 required by the second electric machine 30. As an alternative to the electrical power 32 required by the second electric machine 30, there is associated with the second electric machine 30 an electrical power 34 which can be drawn from the second electric machine 30. If the electrical power 22 from the electrical energy source 10 is required for the first electric machine 20, the flow of power 21 from the electrical energy source 10 to the first electric machine 20 is established. If the electrical power 32 from the electrical energy source 10 is required for the second electric machine 30, the flow of power 31 to the second electric machine 30 is established. If the sum of the two required powers 22, 32 exceeds the power 12 which can be drawn, the power 12 which can be drawn is apportioned to the electric machines 20, 30 in the ratio of the required electrical powers 22, 32 with corresponding flows of power 21, 31.

If, as an alternative to the power 32 required for the second electric machine 30, the electrical power 34 can be drawn from the second electric machine 30, the first electric machine 20 requires an electrical power 22 which can be drawn from the electrical energy source 10 and/or from the second electric machine 30. If the electrical power 22 required for the first electric machine 20 exceeds the electrical power 12 which can be drawn from the electrical energy source 10, the two powers 12, 34 which can be drawn are allocated to the first electric machine 20. In addition to the flow of power 21 from the electrical energy source 10 to the first electric machine 20, a further flow of power 35 from the second electric machine 30 to the first electric machine 20 is then established. If the electrical power 22 required for the first electric machine 20 is less than the powers 12, 34 which can be drawn, the flow of power 31 is established as a flow of power from the second electric machine 30 to the electrical energy source 10, in order to charge the electrical energy source if it is in the form of a battery.

Figure 3:
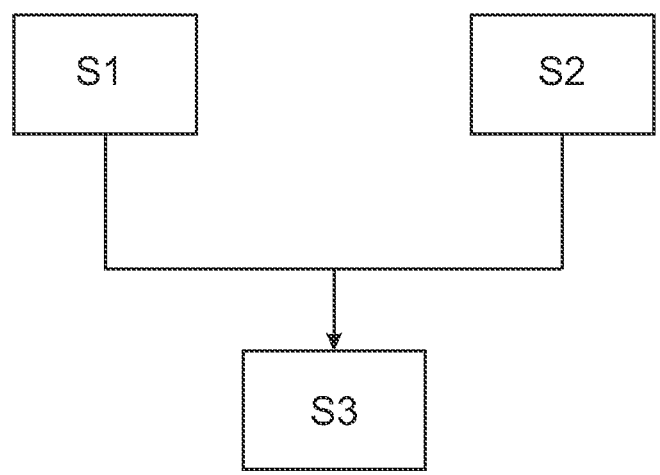
FIG. 3 shows a flow diagram of method steps of a method for controlling a flow of electrical power in an exemplary arrangement of the disclosure.

In FIG. 3, method steps S1, S2 and S3 are shown in a temporal sequence for carrying out a method for controlling the system 100 shown in FIG. 1 and the flows of electrical power 21, 31, 35, shown in FIG. 2, between the electrical energy source 10, the first electric machine 20 and the second electric machine 30 of the working vehicle.

In a first step S1, a withdrawal determination is carried out. In this step S1, the electrical power 12 which can be drawn from the energy source 10 is determined. In a further second step S2 in parallel with the first step S1, a requirement determination is carried out. In this step S2, the electrical powers 22, 32 required by the electric machines 20, 30 are determined.

In a third step S3, an electrical power distribution is carried out. In this step S3, which is based on the preceding steps S1 and S2, the electrical power 12 which can be drawn from the energy source 10 is distributed to the electric machines 20, 30 in the ratio of the required electrical powers 22, 32. Step S3 is carried out if the required powers 22, 32 are greater in total than the electrical power 12 which can be drawn.

The invention claimed is:

1. A method for controlling a flow of electrical power between an electrical energy source and a first and a second electric machine of a working vehicle, comprising the steps: making a determination of a first electrical power which can be drawn from the electrical energy source, making a determination of second and third additional electrical powers required for the first and second electric machines, and distributing the first electrical power which can be drawn from the electrical energy source to the first and second additional electric machines in a ratio of the required second and third additional electrical powers if a sum of the second and third additional required electrical powers is greater than the first electrical power which can be drawn from the electrical energy source.

2. The method as claimed in claim 1, wherein the step of distributing comprises an allocation, which can be carried out independently of the required second and third additional electrical powers, of a predefined minimum proportion of the first electrical power which can be drawn to one of the first and second electric machines.

3. The method as claimed in claim 1, wherein the step of distributing comprises a distributing a portion of the first electrical power which can be drawn in dependence on a state of the electrical energy source.

4. The method as claimed in claim 1, further comprising determining either the second or third additional electrical power which can be drawn from one of the of the first or second electric machines by energy recovery, wherein the second or third additional electrical power which can be drawn from the one of the first or second electric machine is taken into account in the distributing_step.

5. The method as claimed in claim 4, wherein the step of distribution comprises an allocation of the second or third electrical power which can be drawn from the one of the first or second electric machine to another of the first or second electric machine.

6. The method as claimed in claim 1, wherein one of the first and second electric machines is configured to drive a drive train of the working vehicle, and another of the first and second electric machines is configured to drive a working hydraulics system of the working vehicle.

7. The method as claimed in claim 1, wherein the electrical energy source comprises a battery, and the working vehicle is in the form of a working vehicle which is operable by the battery.

8. The method as claimed in claim 1, wherein the electrical energy source comprises a fuel cell, and the working vehicle is in the form of a working vehicle which is operable by the fuel cell.

9. A controller for controlling a flow of electrical power between an electrical energy source and at least first and second electric machines of a working vehicle, comprising: an interface for inputting a specific quantity of a first electrical power which can be drawn from the electrical energy source, an interface for inputting specific quantities of at least second and third electrical powers required for the at first and second electric machines, a computing unit which is adapted to calculate distribution quantities for distribution of the first electrical power which can be drawn to the at least first and second electric machines in a ratio of the at least second and third required electrical powers if a sum of the at least second and third electrical powers is greater than the first electrical power which can be drawn, and an interface for outputting of a calculated distribution quantities.

10. A working vehicle having an electrical energy source, at least first and second electric machines, and a controller as claimed in claim 9.

11. The method of claim 2, wherein the step of distributing comprises distributing a portion of the first electrical power which can be drawn in dependence on a state of the electrical energy source.

12. The method of claim 1, wherein distributing comprises a distributing a portion of the first electrical power which can be drawn in dependence on a state of the electrical energy source and further comprising determining one of a second and third electrical power which can be drawn from one of the first and second electric machines by energy recovery, wherein the second or third electrical power which can be drawn from one of the first and second electric machines is taken into account in the distributing step.

13. The method of claim 1, wherein the step of determining the first electrical power that can be drawn from the electrical energy source and the step of determining at second and third additional electrical powers required for the first and second electric machines is performed in parallel with one another.

14. A system for managing a flow of electrical power for a vehicle, comprising:
an electrical energy source;
a first electric machine;
a second electric machine; and
a controller;
wherein the electrical energy source is connected to the controller via a first input interface;
wherein the first electric machine is connected to the controller via a first power electronics and wherein the first power electronics is connected to the controller via a second input interface and a second output interface;
wherein the second electric machine is connected to the controller via a second power electronics of the second electric machine and wherein the second power electronics is connected to the controller via a third input interface and a fourth output interface; and
wherein a first flow of power is provided between the controller and the first electric machine a second flow of power is provided between the controller and the second electric machine, wherein the controller determines a third flow of power that may be drawn from the energy source and makes a determination of a required electrical power required for the first and second electric machines, and distributes the third electrical power that can be drawn to the first and second electric machines in a ratio of the required electrical powers if the sum of the required electrical powers is greater than the third electrical power that can be drawn.

15. The system of claim 14, wherein the first electric machine is operatively connected to a drive train.

16. The system of claim 14, wherein the second electric machine is operatively connected to a hydraulics system.

17. The system of claim 14, further comprising a third electric machine, wherein the third electric machine is connected to the controller via a third power electronics of the third electric machine, wherein the third power electronics is connected to the controller via a fifth input interface and a sixth output interface, and wherein a fourth flow of power is provided between the controller and the third electric machine.

18. The system of claim 17, wherein the controller determines the third flow of electrical power that may be drawn from the energy source and makes a determination of a required electrical power required for the first, second and third electric machines, and distributes the electrical power that can be drawn to the first, second and third electric machines in a ratio of the required electrical powers if the sum of the required electrical powers is greater than the third flow of electrical power that can be drawn.

19. The system of claim 17, wherein the third electric machine is operatively connected to an auxiliary electrical consumer.

20. The system of claim 14, wherein the electrical energy source is connected via the controller to a charging connection for charging the electrical energy source.

* * * * *